United States Patent
Plank et al.

(10) Patent No.: US 7,736,684 B2
(45) Date of Patent: *Jun. 15, 2010

(54) VISCOUS FAT COMPOSITIONS HAVING LOW AMOUNTS OF TRANS-FAT, METHODS AND PRODUCTS

(75) Inventors: David W. Plank, Taylors Falls, MN (US); Michael A. Staeger, Minnetonka, MN (US)

(73) Assignee: General Mills, Inc., Minneapolis, MN (US)

( * ) Notice: Subject to any disclaimer, the term of this patent is extended or adjusted under 35 U.S.C. 154(b) by 1331 days.

This patent is subject to a terminal disclaimer.

(21) Appl. No.: 11/158,747

(22) Filed: Jun. 22, 2005

(65) Prior Publication Data

US 2006/0019021 A1    Jan. 26, 2006

Related U.S. Application Data (60) Provisional application No. 60/581,993, filed on Jun. 22, 2004.

(51) Int. Cl.
*A23D 9/00*   (2006.01)
*A23D 9/007*  (2006.01)
*A23L 1/00*   (2006.01)

(52) U.S. Cl. .................. 426/607; 426/98; 426/531; 426/601; 554/198; 554/199; 554/212

(58) Field of Classification Search ........... 426/531, 426/601, 98, 607; 554/212, 199, 198
See application file for complete search history.

(56) References Cited

U.S. PATENT DOCUMENTS

| | | | |
|---|---|---|---|
| 5,304,545 A * | 4/1994 | Mentink et al. | 554/212 |
| 5,676,994 A | 10/1997 | Eskins et al. | |
| 6,129,945 A | 10/2000 | Awad et al. | |
| 6,444,253 B1 * | 9/2002 | Conklin et al. | 426/651 |
| 6,544,579 B1 * | 4/2003 | Landon | 426/606 |
| 7,105,195 B2 | 9/2006 | Plank et al. | 426/601 |
| 7,547,459 B2 | 6/2009 | Plank et al. | 426/601 |
| 2003/0044490 A1 * | 3/2003 | Qi et al. | 426/98 |
| 2004/0180125 A1 | 9/2004 | Plank et al. | |

FOREIGN PATENT DOCUMENTS

| | | |
|---|---|---|
| EP | 1477072 A1 | 5/2003 |
| JP | 08178917 A * | 7/1996 |

OTHER PUBLICATIONS 10 pgs, PCT Search Report and Written Opinion filed on Jun. 22, 2005.
Translation of JP55-34042, filed Mar. 10, 1980 (10 pgs).

* cited by examiner

*Primary Examiner*—Brent T O Hern
(74) *Attorney, Agent, or Firm*—Dale A. Bjorkman; John A. O'Toole (57) ABSTRACT

Fat-containing compositions comprise a fat component having less than 40% by weight of trans fat and a cyclodextrin, wherein at least about 25% of the cyclodextrin in the composition is bound to the fat. The fat compositions as provided herein can be substantially more viscous or harder than a like fat composition that does not contain cyclodextrin that is bound to the fat. Food products and methods of use of food products are described. Methods of making these compositions are also provided.

40 Claims, 1 Drawing Sheet

VISCOUS FAT COMPOSITIONS HAVING LOW AMOUNTS OF TRANS-FAT, METHODS AND PRODUCTS

This application claims the benefit of U.S. Provisional Application No. 60/581,993, filed Jun. 22, 2004, which is hereby incorporated by reference.

FIELD OF THE INVENTION

The invention relates to fat-containing compositions. More specifically, the invention relates to viscous fat-containing compositions having low amounts of trans-fat and to methods of binding cyclodextrin to fats.

BACKGROUND

Recent studies have suggested that trans fatty acids in food products and food intermediates can be detrimental to the general health and well being of consumers in that it contributes to obesity and other health related issues.

Trans fatty acids are unsaturated fatty acids in which the hydrogens of a double bond (or unsaturation) are on opposite sides of the molecule. The trans isomer of the fatty acid causes the carbon chain to assume a straight-chain configuration similar to that of a saturated fat. Trans fatty acids are primarily formed through the metal-catalyzed process of hydrogenation, however they have also been found to form naturally at low levels in cow's milk. By hydrogenating oils through industrial processing, hydrogen atoms are added to unsaturated sites on fatty acids, creating a larger population of saturated fats in the oil. In a partially-hydrogenated oil, some of the unsaturated fatty acids remain. However, the processing causes some of the double-bonds of the unsaturated fatty acids to undergo isomerization to the trans configuration.

Partial hydrogenation of fats was introduced into the U.S. food supply beginning in 1910. The practice was put into widespread use in the 1940's in order to make semisolid fat products. The process of hydrogenation raises the melting point of a fat and increases the solid fat content. The stability of the fat is greatly enhanced through hydrogenation by reducing susceptibility to oxidation and subsequent rancidity. Therefore, positive contributions to shelf-life, texture and taste of food products are imparted by hydrogenated and partially hydrogenated fats.

Some scientific evidence shows that the trans fat that results from partial hydrogenation of oils raises the total cholesterol in humans to a greater extent than saturated fats. Trans fat is known to increase blood levels of low density lipoprotein (LDL), so-called "bad" cholesterol, while lowering levels of high density lipoprotein (HDL), known as "good" cholesterol.

Cyclodextrins have been used principally for the encapsulation of insoluble compounds on a molecular basis in order to enhance stability, reduce volatility and alter solubility as well as to increase shelf life of certain products. Such prior uses of cyclodextrins have been limited to flavor carriers and protection of sensitive substances against thermal decomposition, oxidation and degradation. In addition, more recently, cyclodextrins have also been used to remove fatty acids and cholesterol from animal fats and to remove cholesterol and cholesterol esters from egg yolks.

One potential solution to the high cholesterol problem teaches the treatment of the foodstuffs themselves with cyclodextrins rather than treatment of the consumer. U.S. Pat. Nos. 5,498,437; 5,342,633 and 5,063,077 discuss various processes for the removal of cholesterol and cholesterol esters from egg yolks, meat, animal fats, etc. It is thought that by reducing the level of cholesterol in such foodstuffs that overall levels of cholesterol can be reduced in consumers. However, processing steps to such foodstuffs increases the cost of delivering such products to market.

In some instances, a thickened fat is desired to provide dimensional stability (e.g., to minimize fluid flow or keep a fat ingredient in a particular location in a food article). At present, only three techniques for providing a thickened fat such as for use in a food product are practical. The first, hydrogenation, as described above, while useful and widely practiced undesirably results in the generation of trans fatty acids. The second technique involves addition of silicon dioxide to an oil. For example, U.S. Pat. No. 3,669,681 describes preparing a shortening for products which are heated prior to consumption, wherein edible oils are mixed with silicon dioxide and a bridging compound with the result being a shortening that is asserted to not weep or run at elevated temperatures while retaining desirable mouth feel characteristics of the untreated oil.

While useful, current food regulatory restrictions restrict employment of this technique. The third technique involves addition of sufficient amounts of hardstock, whether naturally occurring (such as palm oil hardstock) or synthetic (such as produced by hydrogenation), to an oil to provide desired amounts of thickening or hardening. Again, while useful, current consumer heath sensitivities favor minimization of consumption of such hardstock ingredients.

SUMMARY OF THE INVENTION

The present invention provides a new technique for thickening or hardening fats and oils that is both useful and commercially practical (i.e., both economically and from a commercial production standpoint). The present new fat thickening technique is inexpensive, simple to commercially practice, and minimizes consumption of undesirable food ingredients such as trans fatty acids.

It has surprisingly been found that by binding cyclodextrin to fat in high binding ratios, a low trans fat content fat can be prepared having a high viscosity. The resulting thickened fat has a low amount of free cyclodextrin. Thus, embodiments of the invention can leave little or no residue on heating. Additionally, embodiments of the invention can absorb little or no flavors other than from the food. Additionally, the resulting fat composition can exhibit enhanced resistance to oxidation of the fat, thereby prolonging useful storage life of the fat composition or food products containing the composition with diminished observance of rancidity of the fat. A fat-containing composition is provided comprising a fat component having less than 40% by weight of trans fat and a cyclodextrin, wherein at least about 25% of the cyclodextrin in the composition is bound to the fat. In additional embodiments, the fat component has less than 20%, 10% or 2% of trans fat. Alternatively, the fat component can be substantially free of trans fat. In an embodiment of the present invention, the composition comprises less than about 50% saturated fat based on total fat content. In additional embodiments, the fat component has less than 25% or 15% of saturated fat based on total fat content. The fat compositions as provided herein can be substantially more viscous (when a liquid), or harder (when a solid) than a like fat composition that does not contain cyclodextrin that is bound to the fat. This thickening and/or hardening of the fat can provide compositions that achieve desired physical properties even with little or no saturated fats. Thus, in one embodiment the present invention can provide food products having desired organoleptic properties while achieving at least a 25% reduction in fat as compared to an appropriate reference food as described in 21 CFR Sec 101.13(j)(1). Thickened fats are important for use in food products in that they provide the required consistency at the correct temperature to enable preparation of the food product. For example, a fat having the consistency of shortening is required to make laminated dough products and certain baked goods. Without the relatively hard consistency, the products would not have the texture that consumers have come to expect. Additionally, the perceived melting point of the fat contributes to the mouthfeel of the food product. The present invention advantageously provides the desired physical and general organoleptic properties of a thicker or harder fat without introduction of trans-fats, thereby providing substantial healthful benefits.

Alternatively, bound fat/cyclodextrin compositions as provided herein can be blended with saturated fats to achieve desired organoleptic and performance properties with a substantial reduction in saturated fat content as compared to other food products that do not contain the bound fat/cyclodextrin compositions.

In another aspect of the present invention, food products are provided comprising fat-containing compositions comprising a fat component having less than 0.5 g per serving of trans fat, and having a cyclodextrin, wherein at least about 25% of the cyclodextrin in the composition is bound to the fat. Methods of using these food products comprising heating these food products by the non-manufacturing consumer are additionally provided. In such methods, the consumer can realize the benefit of having a convenient product having a fat composition with the desired viscosity and cooking behavior, while simultaneously having low levels of trans fat. In additional embodiments, the food product is substantially free of free cyclodextrin and/or is substantially free of saturated fat.

In another aspect of the present invention, a method of preparing a thickened fat composition is provided. In this method, a cyclodextrin is solubilized in solvent, and then a fat component is mixed with the solvent-solubilized cyclodextrin to form a fat/cyclodextrin/solvent mixture. This fat/cyclodextrin/solvent mixture is separated into separate portions, wherein at least one portion is a thickened fat/cyclodextrin composition comprising fat that has been complexed with cyclodextrin. In this thickened fat/cyclodextrin composition, at least about 25% of the cyclodextrin is bound to the fat. The thickened fat/cyclodextrin composition is then segregated from the remaining portions of the fat/cyclodextrin/solvent mixture.

In an alternative method of preparing a thickened fat composition, a cyclodextrin is solubilized in a solvent. The solubilized cyclodextrin is added to a fat at an addition rate that is sufficiently slow and with sufficient agitation to provide a thickened fat/cyclodextrin composition comprising fat that has been complexed with cyclodextrin. At least about 25% of the cyclodextrin in the thickened fat/cyclodextrin composition is bound to the fat.

In another aspect of the present invention, it has surprisingly been found that very efficient binding of cyclodextrin to fat can be achieved by carrying out the complexation steps in a selected manner. The resulting fat/cyclodextrin complex provides a low trans fat content fat having a high viscosity. In an aspect of the present invention, the resulting thickened fat has a low amount of free cyclodextrin.

In one aspect of the present invention, a method of preparing a thickened fat composition is provided comprising first solubilizing a cyclodextrin in a solvent and also providing a first fat composition. The first fat composition is mixed with the solubilized cyclodextrin to form a first fat/cyclodextrin/solvent mixture comprising a first fat/cyclodextrin complex. The temperature difference between the first fat composition and the solubilized cyclodextrin at the initial time of mixing is less than or equal to about 15° C. This methodology produces both superior manufacturing efficiency and additionally can provide more consistent and better performing thickened and/or hardened fat products. The above described methods wherein the fat/cyclodextrin/solvent mixture is separated into separate portions or the solubilized cyclodextrin is added to a fat at an addition rate that is sufficiently slow and with sufficient agitation to provide a thickened fat/cyclodextrin composition comprising fat that has been complexed with cyclodextrin also benefit from carrying out the initial mixing of the fat composition and the solubilized cyclodextrin at a temperature difference is less than or equal to about 15° C.

DETAILED DESCRIPTION

A particular benefit of the present invention is that the fat provided herein does not rely on hydrogenation of fat to provide a thickened fat. In an aspect of the present invention, the fat as thickened as described herein has an Iodine Value that does not decrease more than 5% relative to the unthickened component fats. Iodine Value may be determined by any appropriate technique, provided that the Iodine Value of both the thickened fat and unthickened component fats are determined by the same method so that the percent decrease can be appropriately determined. An exemplary methodology for measuring Iodine Value is AOCS Cd 1b-87.

In one embodiment of the present invention, the cyclodextrin is present in an amount of from about 0.001% to about 75% by weight of the fat component. In another embodiment, the cyclodextrin is present in an amount of from about 0.05% to about 15% or 1% to about 10% by weight of the fat component. In another embodiment, the fat component is selected such that it has a viscosity less than about 12,500 cP at room temperature (i.e. 25° C.) measured relative to part number 12500 cps available from Brookfield Engineering Laboratories, Inc., 11 Commerce Boulevard, Middleboro, Mass., USA, 02346, and the cyclodextrin is present and bound to the fat in an amount sufficient to exhibit a viscosity of a composition consisting of the fat component and the cyclodextrin that is greater than 2 times the viscosity of the fat component without the cyclodextrin. In additional such embodiments, the viscosity of a composition consisting of the fat component and the cyclodextrin is greater than 10 times, 20 times or 30 times the viscosity of the fat component without the cyclodextrin. In another embodiment of the invention, the viscosity of the fat/cyclodextrin composition is greater than about 12,500 cP at room temperature (i.e. 25° C.) measured relative to part number 12500 cps available from Brookfield Engineering Laboratories, Inc., 11 Commerce Boulevard, Middleboro, Mass., USA, 02346, and the cyclodextrin is present and bound to the fat in an amount sufficient to exhibit a hardness of a composition consisting of the fat component and the cyclodextrin that is greater than 2 times the hardness of the fat component without the cyclodextrin. In additional such embodiments, the hardness of a composition consisting of the fat component and the cyclodextrin is greater than 10 times, 20 times or 30 times the hardness of the fat component without the cyclodextrin.

Compositions are also provided wherein the cyclodextrin is present and bound to the fat in an amount sufficient to provide a composition that has a Solid Fat Content at 21.1° C. that is at least about 1% higher than the Solid Fat Content at 21.1° C. of the fat component without the cyclodextrin. In additional such embodiments, the composition has a Solid Fat Content at 21.1° C. that is at least about 5%, about 8% higher or alternatively at least about 10% higher than the Solid Fat Content at 21.1° C. of the fat component without the cyclodextrin.

In an embodiment of the invention, at least about 50% of the cyclodextrin in the composition is bound to the fat. In additional embodiments of the invention, least about 75% or 90% of the cyclodextrin in the composition is bound to the fat.

The cyclodextrin in one embodiment of the present invention comprises alpha-cyclodextrin, beta-cyclodextrin, gamma-cyclodextrin, or mixtures thereof. Cyclodextrins comprise a doughnut shaped or cyclical structure composed of a number of alpha-D-glucose units (typically 6-8) having a hydrophilic exterior and a hydrophobic interior. Cyclodextrins are generally water soluble, although alpha-cyclodextrin is likely more water soluble than beta-cyclodextrin or gamma-cyclodextrin, and free flowing crystalline powders that are substantially if not completely odorless and white in color.

In one embodiment of the invention, at least a portion and preferably substantially all the cyclodextrin is alpha-cyclodextrin. Alpha-cyclodextrin is a cyclized ring of six alpha 1,4 linked glucose units. Alpha-cyclodextrin has a cavity dimension of about 0.50×0.79 (nm). The solubility of alpha-cyclodextrin in water is good and at 25° C. is about 14 (gm/100 mL). In contrast, the native solubility of cyclodextrins in fats is poor. A useful alpha-cyclodextrin is commercially available in the United States from Wacker Specialties, Adrian, Mich. 49221 and sold under the trademark CAVAMAX® W6 Wacker-Chemie, Burghausen, Germany.

In another embodiment of the invention, alpha-cyclodextrin is used in combination or synergistically with beta-cyclodextrin and/or gamma-cyclodextrin, in particular ratios dependent upon the requirements of the ultimate user. In an exemplary embodiment, alpha-cyclodextrin can be used individually or can be combined with between 0-50% by weight beta-cyclodextrin or gamma-cyclodextrin or with between 0.1 to about 40% by weight beta-cyclodextrin. Beta-cyclodextrins and gamma-cyclodextrins are also available from Wacker Specialties, Adrian, Mich., USA, 49221.

One method of preparing cyclodextrins includes enzymatic treatment. Enzymatic degradation or treatment of the starch to produce cyclodextrins useful in the present invention is done through the use of cyclodextrin glucosyltransferase (CGTase, EC 2.4.1.19) or other enzymes, which results in a cyclic ring of sugar. In one method, cyclodextrins are produced by the action of cyclodextrin glucosyltransferase on hydrolyzed starch syrups at neutral pH (6.0-7.0) and moderate temperature (35-40° C.). Alternatively, cyclodextrins can be produced in planta by the expression of the gene encoding CGTase in the food plant of interest.

In preparation of the cyclodextrin/fat composition, fat components can be selected from oils and shortenings. Examples of such oils can include oil ingredients from vegetable, dairy and marine sources including butter oil or butterfat, soybean oil, corn oil, rapeseed or canola oil, copra oil, cottonseed oil, fish oil, safflower oil, olive oil, sunflower oil, peanut oil, palm oil, palm kernel oil, coconut oil, rice bran oil and other plant derived oils such as vegetable or nut oils. Examples of shortenings include animal fats such as lards, butter and hydrogenated vegetable oils such as margarine. Mixtures of different fats are also contemplated.

In an embodiment of the invention, the fat comprises an oil selected from soybean oil, high-oleic sunflower oil, high-linoleic soybean oil, palm oil, palm kernel oil or coconut oil. Particularly advantageous oils include low linolenic, high stearic soybean oil; canola oil; high or mid oleic canola oil; high or mid oleic sunflower oil, rice bran oil; and hydrogenated rapeseed oil.

An alternative fat composition comprises fat having a viscosity greater than about 12,500 cP at room temperature (i.e. 25° C.) measured relative to part number 12500 cps available from Brookfield Engineering Laboratories, Inc., 11 Commerce Boulevard, Middleboro, Mass., USA, 02346. An embodiment of a fat has a Solid Fat Content of greater than 15 at 21.1° C. Examples of solid fat compositions include animal fats such as lard, butter, and hydrogenated vegetable oils such as margarine.

The fats can be emulsified or stabilized with mono- or diglycerides or other emulsifiers known in the art. Examples of emulsifiers include fully hydrogenated soybean oil mono-, di-, or tri-glyceride; mono-, di-, or tri-stearate, sodium stearyl-2-lactylate, and mixtures thereof.

Additionally, the fat/cyclodextrin composition can comprise adjuvants such as colorants, flavorants, texture modifiers, preservatives, stabilizers, and the like, designed to improve the taste, appearance and nutritional properties of the finished products. If present, each such adjuvant ingredient can in one embodiment of the invention be present in an amount ranging from about 0.01% to about 5% of the thickened fat product The present thickened fat ingredients find particular suitability for use in connection with consumer food products. While particular attention is thus paid to such consumer food products in the present description, the skilled artisan will appreciate that the invention also can find suitability for use in connection with other product applications. For example, the present application can find usefulness in the provision of animal feed products especially for common companion animals such as dogs and domestic cats. The thickened fat ingredients can also find usefulness in the provision of, other non-food products, e.g., cosmetics (e.g., hand crèmes and lotions), soaps or shampoos or other viscous surfactant compositions that are based upon fatty triglycerides, e.g. paints using linseed oil as drying oil. In still other applications, the oils can be inedible such as those that are petroleum based.

In an embodiment of the invention, the fat-containing composition is utilized in a food product. In an embodiment of the invention, the food product is provided as a packaged food product, either in bulk, in multiple servings (i.e. from about 2 to about 20 servings) or as single serving. The thus packaged food product can be provided in the cooked state, or the uncooked state. Examples of such food products include those that are packaged for heating by a non-manufacturing consumer. The physical and organoleptic properties of the fat-containing composition as described herein can provide particular benefit in such food products due to their shelf stability, excellent performance under a variety of environmental conditions. One particular example of a food product finding benefit of the present invention is related to products that are packaged for microwave heating.

Thus, the present invention provides a method of using the food product wherein the food product is packaged for subsequent heating of the food product by a non-manufacturing consumer. For purposes of the present invention, a "non-manufacturing consumer" is a party that does not assemble the raw ingredients of the food product, but instead can under-take one or more subsequent food preparation operations such as subdividing the food product into smaller portions and heating and optionally applying auxiliary ingredients such as sauces and the like to the food product. Examples of such non-manufacturing consumers include institutional food providers such as school cafeterias and hospitals and the like, and restaurants and the like. A sub-group of the non-manufacturing consumer is the retail customer, who is the individual party purchasing the food product for non-commercial use, such as feeding the family in the home. In an embodiment of the invention, the food product is provided as a packaged food product, either in bulk, in multiple servings (i.e. from about 2 to about 20 servings) or as single serving.

In one embodiment, this packaging is for microwave heating of the food product by a non-manufacturing consumer. In a specific example of this embodiment, the food product is packaged in a package suitable for placement in a microwave oven. In a more specific example, the package is designed to assist in cooking of the food product in a microwave oven.

An example of a food product includes laminated dough products. Other examples of food products included biscuits, croissants, crescent rolls, cookies, cereals and cereal based products (particularly ready to eat ("R-T-E") cereals i.e. grain or vegetable based products in the form of flakes, extruded shapes or puffed, and optionally containing fruits and/or nuts or other such ingredients, such as corn flakes, puffed wheat, puffed rice, raisin bran flakes, and the like), cakes, snack bars, cereal bars, granola bars, bread products (such as loaf breads, rolls, and buns), and the like. Another example of a food product is a tablespread, such as butter or margarine, and in particular flavored spreads.

The thickened fat can be used as an ingredient or phase of a food product. For example, a fondant composition comprising the thickened fat and sugars (e.g., powdered sugar) can be used as a topical ingredient or a food phase (e.g., as a crème center to baked cookie wafers or other cookies or to a granola bar) or as a coating or icing for a variety of finished baked goods. The fondant can be the center of a filled candy or chocolate such as truffles. If desired, the fondant can also be aerated. In other food use applications, the thickened fat can be employed as an ingredient in a fat and oil, e.g., a peanut butter whose oil ingredient does not separate even though non-hydrogenated.

In other variations, the thickened fat can be saponified with an alkali such as sodium or potassium hydroxide to make a thickened vegetable oil soap.

In still other variations, the thickened fats can be used as an ingredients in various emulsions whether water-in-oil ("w/o") or oil-in-water ("o/w") in both food and non-food applications.

In a method of the present invention, a cyclodextrin is first solubilized in solvent. Generally, the cyclodextrin is added to solvent in an amount up to the solubility of the cyclodextrin in the solvent at the temperature of mixing. The solvent used for solvation of the cyclodextrin can be any solvent suitable for processing of the particular product to be prepared. For example the solvent desirably is safely consumable without adverse health concerns, or is readily removed from the product prior to consumption. Examples of particularly suitable solvents include water, alcohol, and mixtures of water and alcohol. Examples of alcohols particularly desired for use in the present invention include an edible alcohol such as non denatured ethanol or mixtures of water and ethanol. In additional embodiments, the water is at least deionized water and is preferably distilled water. Thus, at room temperature a typical process will include adding and mixing cyclodextrin to water in an amount of about 14% cyclodextrin by weight.

In an embodiment that provides excellent performance results, the cyclodextrin is solubilized in solvent at a cyclodextrin:solvent mix ratio of from about 0.01:1 to about 5:1 by weight, respectively. Fat is then mixed with the cyclodextrin-water mixture preferably in liquid form (e.g., added at a temperature above its melting point) and preferably with vigorous agitation for durations sufficient to form a slurry of cyclodextrin at least partially complexed with the fat ingredient.

This mixture is caused to separate into separate portions especially involving mechanical separation, wherein one portion is a thickened fat/cyclodextrin composition comprising fat that has been complexed with cyclodextrin. The separation step can include any appropriate technique, such as churning, centrifuging, hydrocyclone processing, decanting, and the like. At least about 25% of the cyclodextrin in this thickened fat/cyclodextrin composition is bound to the fat. The thickened fat/cyclodextrin composition is segregated from the remaining portions of the fat/cyclodextrin/solvent mixture. The preparation method can be practiced at any suitable temperature, including temperatures ranging from about 5° C. to about 100° C. at atmospheric pressure. As noted above, in an embodiment of the invention, the solubilized cyclodextrin is mixed with the fat composition when the fat is in the form of a liquid above its melting point to facilitate the formation of the cyclodextrin fat complex.

In an embodiment of the invention, the fat/cyclodextrin/solvent mixture is separated by centrifuging the mixture for a time and at a speed sufficient to separate the mixture into portions that are segregatable layers. This centrifuging operation can be carried out at any appropriate temperature. In one embodiment, the centrifuging operation is carried out at a temperature of about 5 to 25° C.

The segregatable layers can be characterized in any way appropriate to identify the desired portion for the particular use of the ultimate fat composition. For example, the fat/cyclodextrin/solvent mixture can be separated into at least first, second and third portions based upon density. In this embodiment, the first portion or lightest or least dense portion can be a thickened fat/cyclodextrin composition comprising fat that has been complexed with cyclodextrin, wherein at least about 25% of the cyclodextrin in the thickened fat/cyclodextrin composition is bound to the fat, the first portion having a density less than 1 g/ml. The second portion can be a more dense aqueous phase containing solubilized cyclodextrin. The third portion or heaviest portion can be a thickened fat/cyclodextrin composition comprising fat that has been complexed with cyclodextrin, the third portion having a density greater than 1 g/ml. In this embodiment, the first and third portions can find particular utility in various food products, where the removal of the second portion in this process assures that a low level of unbound cyclodextrin is present in the ultimate food product. Previous compositions comprising both cyclodextrin and fat did not contemplate removal of uncomplexed cyclodextrin as provided herein.

The desired layer for use in various products can be segregated from the other layers in any appropriate manner, such as decanting, pumping or draining. For example in the three layer embodiment as discussed above, material can be removed from the top layer to segregate the first portion. Alternatively, material can be removed from the middle layer to remove the second portion, with optional subsequent mixing of the top and bottom layer to provide a composition that is a mixture of the first and third portions. Alternatively, material can be removed from the bottom layer to segregate the third portion. Optionally, the second portion, which comprises unbound cyclodextrin, can be reused in subsequent processes to provide high efficiency use of available raw materials.

In an embodiment of the invention, the method additionally comprises the step of removing solvent from the thickened fat/cyclodextrin composition to an amount of less than about 20%, 10% or 5% by weight of the total thickened fat/cyclodextrin composition. In other embodiments, substantially all moisture is removed from the thickened fat (i.e., to provide a moisture content of less than 1%). Removal of solvent can be carried out by any appropriate drying technique process, such as spray drying, paddle drying, drum drying, freeze drying, or evaporation of solvent by bulk heating.

In another embodiment of the invention, cyclodextrin is solubilized in a solvent, and the solubilized cyclodextrin is added to a fat at an addition rate that is sufficiently slow and with sufficient agitation to provide a thickened fat/cyclodextrin composition comprising fat that has been complexed with cyclodextrin. At least about 25% of the cyclodextrin in the thickened fat/cyclodextrin composition is bound to the fat.

As above, the solvent used for solvation of the cyclodextrin can be any solvent suitable for processing of the particular product to be prepared. For example the solvent desirably is safely consumable without adverse health concerns, or is readily removed from the product prior to consumption. Examples of particularly suitable solvents include water, alcohol, and mixtures of water and alcohol. The cyclodextrin can be provided in any desired weight ratio relative to the solvent. Examples of desired weight ratios include from about 1:10 to about 10:1, or from about 5:1 to about 1:5, or from about 2:1 to about 1:2 of cyclodextrin to solvent.

In an embodiment of the invention, the addition of the solubilized cyclodextrin to the fat can be carried out at a temperature of from about 4° C. to about 95° C., and in another embodiment from about 30° C. to about 80° C. It is contemplated that the addition of the solubilized cyclodextrin to the fat can be carried out under an inert atmosphere, such as nitrogen. Either the solubilized cyclodextrin and/or the fat additionally optionally can comprise an emulsifier, such as palm distilled monoglycerides.

In embodiments of the present invention, the resulting thickened fat/cyclodextrin composition can comprise up to about 40%, of solvent (and particularly water) by weight. In other embodiments, the resulting thickened fat/cyclodextrin composition can comprise less than about 20%, or 10%, or 5% of solvent (and particularly water) by weight. Advantageously, this method facilitates achievement of a low solvent content as a function of the total thickened fat/cyclodextrin composition by optionally limiting the amount of solvent that is added to the fat in the first place. Alternatively, excess solvent may be added, and subsequently removed by solvent removal processes as discussed above. This method of manufacture thus can provide substantial benefit in reduction of costs that would otherwise be incurred in the solvent removal process, and in providing a simple manufacturing process that does not necessitate investment in capital equipment such as centrifuges and the like for manufacture of the desired thickened fat/cyclodextrin composition.

As noted above, it has surprisingly been found that superior manufacturing efficiency that can result in better performing thickened and/or hardened fat products are provided by the manufacturing methodology described herein. More specifically, a method of preparing a thickened fat composition is provided comprising first solubilizing a cyclodextrin in a solvent and also providing a first fat composition.

The first fat composition is mixed with the solubilized cyclodextrin to form a first fat/cyclodextrin/solvent mixture comprising a first fat/cyclodextrin complex. The temperature difference between the first fat composition and the solubilized cyclodextrin at the time of mixing is less than or equal to about 15° C.

In one embodiment, the temperature of the first fat composition is greater than or equal to the temperature of the solubilized cyclodextrin at the time of mixing.

The method can in one embodiment be carried out wherein the first fat composition is a fat from only one source and contains substantially no additional fats. In another embodiment, the first fat composition comprises only a single fat, and substantially no additional ingredients. Alternatively, the method can be carried out wherein the first fat composition comprises a mixture of fats.

In one embodiment, the present method contemplates mixing a second fat composition with the first fat/cyclodextrin/solvent mixture after formation of the first fat/cyclodextrin complex. In this embodiment, the second fat composition is not complexed with cyclodextrin. In another embodiment, the present method contemplates carrying out a separate fat complexation process with a second fat composition. In other words, providing a second fat composition and mixing the second fat composition with the solubilized cyclodextrin to form a second fat/cyclodextrin/solvent mixture comprising a second fat/cyclodextrin complex, wherein the temperature difference between the second fat composition and the solubilized cyclodextrin at the time of mixing is less than or equal to about 15° C. Subsequently, the first fat/cyclodextrin complex is mixed with the second fat/cyclodextrin complex. This embodiment finds particular benefit where it is desirable to complex both fats in a fax mixture, but the rate of complexation of the two fats with cyclodextrin is sufficiently different that one fat would be complexed more than the other if it was attempted to complex both in the same reaction vessel.

It has additionally been discovered that the temperature at which optimal complexation takes place of any given fat with cyclodextrin in the present method may be uniquely identified for each fat. Thus, it has surprisingly been found that palm oil generally favorably complexes with cyclodextrin in the present method at about 50° C. In one embodiment, the first fat composition comprises palm oil, and the temperature of each of the first fat composition and the solubilized cyclodextrin at the time of mixing is from about 35° C. to about 65° C. Similarly, it has surprisingly been found that canola oil generally favorably complexes with cyclodextrin in the present method at about 15° C. In one embodiment, the first fat composition comprises canola oil, and the temperature of each of the first fat composition and the solubilized cyclodextrin at the time of mixing is from about 0° C. to about 30° C. In one aspect of the present invention, the temperature at which optimal complexation takes place of any given fat composition with cyclodextrin in the present method is determined through experimentation that with knowledge of the present disclosure will now be recognized to be routine, and carrying out the complexation method of the present invention within about 15° C. of that optimal complexation temperature.

It has additionally been determined that it is advantageous to carry out the mixing step of the fat composition and the solubilized cyclodextrin and then to hold the composition for a period of at least about 30 minutes. Thus, for example, the first fat composition can comprise palm oil, and the temperature of each of the first fat composition and the solubilized cyclodextrin at the time of mixing is from about 35° C. to about 95° C., and after mixing, the fat/cyclodextrin/solvent mixture is held at a temperature of from about 35° C. to about 95° C. for a period of at least about 30 minutes. In another example, the first fat composition comprises canola oil, and the temperature of each of the first fat composition and the solubilized cyclodextrin at the time of mixing is from about 4° C. to about 80° C., and after mixing, the fat/cyclodextrin/solvent mixture is held at a temperature of from about 0° C. to about 80° C. for a period of at least about 30 minutes.

Additionally, it surprisingly has been determined that it is advantageous to carry out the mixing step of the fat composition and the solubilized cyclodextrin at an initial mixing temperature that is at least about 15° C. higher than the optimal complexation temperature of the fat composition, and then allowing the composition to cool and be held within about 15° C. of the optimal complexation temperature of the fat composition for a period of at least about 30 minutes. Thus, in one embodiment, the first fat composition comprises palm oil, and the temperature of each of the first fat composition and the solubilized cyclodextrin at the time of mixing is from about 50° C. to about 90° C., (and in another embodiment, from about 70° C. to about 90° C.), and after mixing, the fat/cyclodextrin/solvent mixture is held at a temperature of from about 35° C. to about 65° C. for a period of at least about 30 minutes. Similarly in another embodiment, the first fat composition comprises canola oil, and the temperature of each of the first fat composition and the solubilized cyclodextrin at the time of mixing is from about 60° C. to about 80° C., and after mixing, the fat/cyclodextrin/solvent mixture is held at a temperature of from about 0° C. to about 30° C. for a period of at least about 30 minutes.

In an embodiment of the present invention, the ratio of cyclodextrin to first fat composition is about 1-5% by weight. In another embodiment, the solubilized cyclodextrin is added to the first fat composition in sequential additions. The amount of the solubilized cyclodextrin to be added to the fat composition can be precalculated. In an alternative embodiment, it is noted that variations in material behavior and appropriate mix ratios may come about due to different material source or handling factors, and that a preset calculation may not be as accurate or uniform as desired. An advantageous alternative embodiment of the present invention therefore is to determine the amount of the solubilized cyclodextrin to be added to the fat composition by in-process measurement of viscosity of the fat/cyclodextrin/solvent mixture until a predetermined target viscosity is reached.

In all embodiments, an advantageous embodiment of the present method provides that the solubilized cyclodextrin is added to the first fat composition under shear mixing conditions.

Food products can advantageously be formulated using fat compositions as described herein, wherein cyclodextrin is bound to the fat. Reduced amount of unbound cyclodextrin in intimate contact with fat is particularly advantageous, as noted above, in reduction of the generation of undesirable cyclodextrin residues. It is specifically contemplated that food products can additionally comprise cyclodextrin that is not bound to fat, and additionally is not in intimate contact with fat as a separate additive to the food product. For example, cyclodextrin that is not bound to fat and not in intimate contact with fat can be added as a component of encapsulated flavorants, for sequestering of bile acids as taught in U.S. patent application Ser. No. 10/172,471, filed Jun. 14, 2002, titled "FOOD PRODUCT HAVING INCREASED BILE ACID BINDING CAPACITY," LEWANDOWSKI ET AL; for reduction of generation of acrylamides in food products as taught in U.S. patent application Ser. No. 10/630,489, filed Jun. 22, 2003, titled "TREATMENT COMPOSITION FOR REDUCING ACRYLAMIDE IN FOOD PRODUCTS AND FOOD INTERMEDIATES," PLANK ET AL.; or for reduction of cholesterol as taught in U.S. patent application Ser. No. 10/318,445 Filed Dec. 13, 2002, titled "FOOD PRODUCTS CONTAINING CYCLODEXTRINS HAVING BENEFICIAL HYPOCHOLESTEROLEMIC EFFECTS AND METHOD OF MAKING AND COMMUNICATING THE BENEFIT OF SUCH PRODUCTS," PLANK ET AL.

In an embodiment of the present invention, the food product as described herein is provided and additionally, at least one indicium is prepared concerning the beneficial effect of the food product. The indicia are released to consumers, thereby informing the consumer of the surprising low trans-fat and optionally low saturated fat content of the food product. The indicia can optionally be provided in audio or visual media. The release of such indicia is usually tailored to certain pre-selected or predefined formats and can be done through traditional advertising routes that have at least an audio capability such as radio and television as well printed materials. Printed materials can include the packaging into which the product is placed as well as newspapers, letters, direct mail pieces, magazines and the like. This information empowers individuals to make choices regarding the food that they consume, thereby enabling an alteration of the behavior of individuals. Thus, the knowledge of the benefit of the food product of the present invention does not merely inform consumers that the food is good for them, but rather facilitates choice in the total diet to either select food products that will reduce trans-fat and/or saturated fat consumption by the consumer or to permit consumption of additional foods having higher trans-fat and/or saturated fat content than would otherwise be permitted to the consumer who is carefully monitoring trans-fat and/or saturated fat intake.

The invention will further be described by reference to the following nonlimiting examples.

EXAMPLES

Test Protocols

A. Hardness and Spreadability

Hardness can be measured by the force required to obtain a given deformation or by the amount of deformation under a given force. Spreadability is the ease with which a fat can be applied in a thin, even layer to a substrate, such as bread. Although spreadability is also a deformation under an external load, it is a more dynamic property. Measurements of hardness and spreadability are usually highly correlated. Some differences can be observed, however, as a function of the impact of worksoftening on the physical characteristics of the particular fat.

The parameters of hardness and spreadability can be applied to distinguish hardened fats like those produced from complexation with cyclodextrins. A fat or oil thickened with a cyclodextrin will show increases in either hardness, spreadability or both relative to the same fat or oil without added cyclodextrin.

A Model TA.XT Plus Texture Analyzer from Stable Micro Systems, Ltd. is used to measure both hardness and spreadability. The TTC Spreadability Fixture is a set of precisely matched male and female Perspex™ 90° cones. The material is allowed to set up in the lower cone or is filled into the lower cone with a spatula. The material is pressed down only so much as is needed to eliminate air pockets which are visible through the Perspex™ cones, and then the surface is leveled with a flat knife. Excessive work is not introduced into the product. The samples are allowed to equilibrate to the specified temperature (e.g. 23° C.) before testing.

Figure 1:
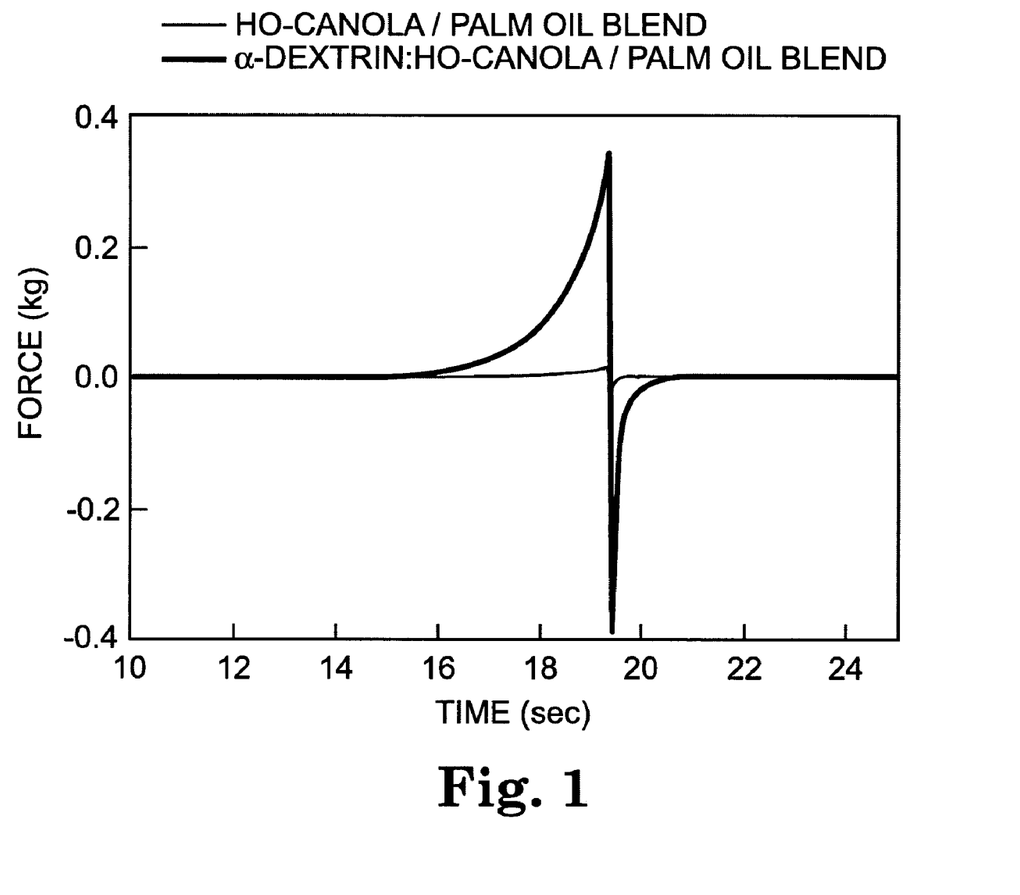
FIG. 1 is a graph showing hardness data measured by a TA.XT Plus Texture Analyzer for a blend of canola oil and palm oil thickened with alpha-cyclodextrin relative to the same proportional blend of the constituent oils.

As seen in FIG. 1, the peak force in the positive direction (hardness) and the total area under the positive curve (spreadability) is greater for a 50:50 blend of canola oil and palm oil thickened with about 2.5% by weight of alpha-cyclodextrin relative to the same proportional blend of the constituent oils. In this instance, the magnitude of the negative peak and area are also increased for the blend of canola oil and palm oil thickened with alpha-cyclodextrin relative to the proportional blend of constituent oils, indicating an increase in adhesion or stickiness when alpha-cyclodextrin is incorporated therein.

B. Determination of Alpha-Cyclodextrin in Fat-Containing Food Products

Solution A: 0.1 M acetic acid
0.7% (w/w) KCl
99.3% $ddH_2O$

Solution B: 2:1 Chloroform:Methanol

Reagent 1: Glyceryl triheptadecanoate (Sigma Prod # T2151-1G)

HPLC System: Column: Superdex Peptide 10/300 GL (Amersham Biosciences)

Flow Rate: 0.5 ml/min

Buffer A: 100 mM $KH_2PO_4$, pH 6.9 filtered and degassed.

Monitors: UV/V is diode array 215 nm (Beckman-Coulter, Model 168, Fullerton, Calif. 92835)

Refractive Index detector (HP Model 1047A, Agilent Technologies Palo Alto, Calif. 94303 USA)

Pump: Beckman-Coulter Model 126, (Beckman-Coulter, Fullerton, Calif. 92835))

Autosampler: Beckman-Coulter Model 508 (Beckman-Coulter, Fullerton, Calif. 92835)

Data analysis: Beckman 32 karat, (Beckman-Coulter, Fullerton, Calif. 92835)

Gas Chromatography System:

Gas Chromatograph: Agilent Model HP 6890 GC System

Column: Agilent Model 122-2362, J&W Scientific DB-23

Durobond FS02 Capillary Column 60 m×0.25 mm.
Film thickness: 0.25 um
Mode: Constant Flow; Initial Flow: 2.1 mL/min
Nominal initial pressure: 32.71 psi
Average velocity: 33 cm/sec Inlet:
Mode: Split
Initial temperature: 250 C
Pressure: 32.70 psi
Split ratio: 50:1
Split flow: 104.9 mL/min
Total flow: 108.6 mL/min
Gas Type: Helium Flame Ionization Detector:
Temperature: 260 C
Hydrogen flow: 40.0 mL/min
Air flow: 450 mL/min
Mode: Constant makeup flow
Makeup flow: 45.0 mL/min
Makeup gas type: Helium Oven:

| Initial Temp: 50 C. | Max Temp: 280 C. |
| Initial Time: 1.00 min | Equilibration time: 0 min |

Ramps:

| # | Rate | Final Temp | Final Time |
|---|------|------------|------------|
| 1 | 25.00 | 175 | 0.00 |
| 2 | 4.00 | 230 | 5.00 |
| 3 | 10.00 | 250 | 10.00 |
| 4 | 0.0 (off) | | |

Post temp: 100 C
Post time: 0.00 min
Run time: 36.75 min

Data analysis:
GC Chemstation A.10.01, Agilent Technologies, Inc., 5301 Stevens Creek Boulevard, Santa Clara, Calif., USA 95051

Method 1A (Macro Method for Foods and Fats with Non-Ionizable Triglycerides)

1. Weigh out 1.000 gram of food sample to each of two clean 250 ml glass screw cap Erlenmeyer flasks with phenolic foil lined caps ("Flask") and record weight.
2. Add Reagent 1, Glyceryl triheptadecanoate, (1.0 mg) to the Flask.

Determination of Unbound Alpha-Cyclodextrin

3. Add 20.0 ml of $ddH_2O$.
4. Heat Sample at 40° C. for 30 minutes.
5. Cool sample to room temperature.
6. Centrifuge one aqueous sample at 5000×g. Use the other aqueous sample as described in 10 below.
7. Filter 1 ml of the centrifuged sample supernatant with 0.45 micrometer nylon filter. Inject on to HPLC molecular sizing column.
8. Take 10 ml of sample from 6 above and concentrate by roto-evaporator to 1 ml (record exact volumes). Filter with 0.45 micrometer nylon filter. Inject on to HPLC molecular sizing column.
9. For Pure Fat Samples Only: Weigh remainder of supernatant sample into tared flask. Evaporate moisture to dryness. Record weight of solids. (note: net weight for non-salt containing fat samples will represent free alpha-cyclodextrin)

Extraction of Fat and Determination of Total Alpha-Cyclodextrin

10. Add 10 ml of 2:1 Chloroform:MeOH to $2^{nd}$ flask 20 ml Vial. Seal cap tightly. Incubate at 40° C. for 1 hour with constant shaking at 250 rpm.
11. Focus organic and aqueous phase by centrifuging for 10 min at 5000 rpm separating the organic phase from the aqueous phase.
12. Withdraw bottom layer (chloroform:MeOH) from the flask avoiding the aqueous layer during the draw. Transfer to a clean flask and dry down and treat as in 13 below.

Determination of Total Fat by Gas Chromatography

13. Resolubilize dried organic phase sample from 12 above with appropriate amount of chloroform (0.5 to 0.9 ml). Transesterify using Alltech MethPrep II (Alltech Associates, Inc., Deerfield, Ill. 60015, USA) or sodium methoxide. Alternatively, saponify samples.
14. Silanate samples (optional for glycerol and sterol determination) and inject on to GC with FID detector or Mass Spec detector (Hewlett Packard Model 5970 MSD; Agilent Technologies Palo Alto, Calif. 94303 USA) to quantify or determine the amount fat or level of sterol related compounds that are found in sample.

Determination of Total (Bound+Unbound) Alpha-Cyclodextrin

15. Centrifuge the isolated aqueous layer from 12 above at 5000×g.
16. Filter 1 ml of the centrifuged sample supernatant with 0.45 micrometer nylon filter. Inject on to HPLC molecular sizing column. Quantify total cyclodextrin relative to a response factor developed from a standard curve of pure cylcodextrin.
17. For Pure Fat Samples Only: Weigh remainder of supernatant sample into tared flask. Evaporate moisture to dryness. Record weight of solids. (note: net weight for non-salt containing fat samples will represent free alpha-cyclodextrin)
18. Subtract free alpha-cyclodextrin amounts determined in 7 and 8 above from values determined in steps 18 and 19, respectively. Value equals total bound alpha-cyclodextrin.

Method 2A (Micro Method for Foods and Fats with Non-Ionizable Triglycerides)

1. Weigh out 0.1000 gram of sample each into two clean 20 ml glass scintillation vial with phenolic foil lined cap ("Vial") and record weight.
2. Add Reagent 1, Glyceryl triheptadecanoate, (0.1 mg) Weigh out 0.1000 gram of sample into each Vial.

Extraction of Unbound Alpha-Cyclodextrin

3. Add 2.0 ml of ddH$_2$O.
4. Heat Samples at 40° C. for 30 minutes.
5. Cool sample to room temperature.
6. Centrifuge one aqueous sample at 5000×g. Use the other aqueous sample as described in 8 below.
7. Filter 1 ml of the centrifuged sample supernatant with 0.45 micrometer nylon filter. Inject on to HPLC molecular sizing column. Determine quantity of alpha-cyclodextrin by integrating peak at approximately 32 minute retention time. Quantify total cyclodextrin relative to a response factor developed from a standard curve of pure cylcodextrin. (Note: The retention time will vary depending on volume of HPLC system. The retention time for a given system should be determined by calibration using a standard of pure cyclodextrin)

Extraction of Fat and Bound Alpha-Cyclodextrin

8. Add 10.0 ml of 2:1 Chloroform:MeOH. Seal cap tightly. Incubate at 40° C. for 1 hour with constant shaking at 250 rpm.
9. Focus organic and aqueous phase by centrifuging for 10 min at 5000 rpm separating the organic phase from the aqueous phase.
10. Withdraw bottom layer (chloroform:MeOH) from the vial with a 10 ml gas tight syringe. Avoiding the aqueous layer during the draw. Transfer to a clean flask and dry down.
11. Resolubilize sample from 10 above with appropriate amount of chloroform (0.5 to 0.9 ml). Transesterify using Alltech MethPrep II (Alltech Associates, Inc., Deerfield, Ill. 60015, USA) or sodium methoxide. Alternatively, saponify samples.
12. Silanate samples (optional for glycerol and sterol determination) and inject on to GC with FID detector or Mass Spec detector (Hewlett Packard Model 5970 MSD; Agilent Technologies Palo Alto, Calif. 94303 USA) to quantify or determine the amount or level of sterol related compounds that are found in sample.

Determination of Total (Bound+Unbound) Alpha-Cyclodextrin

13. Centrifuge the isolated aqueous layer from 10 above at 5000×g for 10 min.
14. Filter 1 ml of the centrifuged sample supernatant with 0.45 micrometer nylon filter. Inject on to HPLC molecular sizing column. Quantify total cyclodextrin relative to a response factor developed from a standard curve of pure cylcodextrin.
15. For Pure Fat Samples Only: Weigh remainder of supernatant sample into tared flask. Evaporate moisture to dryness. Record weight of solids. (note: net weight for non-salt containing fat samples will represent free alpha-cyclodextrin)
16. Subtract free alpha-cyclodextrin amounts determined in 7 above from values determined in steps 14 and 15. Value equals total bound alpha-cyclodextrin.

Method 3A (Micro Method for Foods and Fats with Ionizable Triglycerides, e.g. Phoshatidyl Choline, etc.)

1. Weigh out 0.1000 gram of sample each into two clean 20 ml glass scintillation vial with phenolic foil lined cap ("Vial") and record weight.
2. Add Reagent 1, Glyceryl triheptadecanoate, (0.1 mg) into each Vial.

Extraction of Unbound Alpha-Cyclodextrin

3. Add 2.0 ml of Solution A: 0.1 M Acetic Acid with 0.7% (w/v) KCl.
4. Heat Samples at 40° C. for 30 minutes.
5. Cool sample to room temperature.
6. Centrifuge one aqueous sample at 5000×g. Use the other aqueous sample as described in 9 below.
7. Filter 1 ml of the centrifuged sample supernatant with 0.45 micrometer nylon filter. Inject on to HPLC molecular sizing column. Determine quantity of alpha-cyclodextrin by integrating peak at approximately 32 minute retention time. Quantify total cyclodextrin relative to a response factor developed from a standard curve of pure cyclodextrin. (Note: The retention time will vary depending on volume of HPLC system. The retention time for a given system should be determined by calibration using a standard of pure cyclodextrin)

Extraction of Fat and Bound Alpha-Cyclodextrin

8. Add 10.0 ml of 2:1 Chloroform:MeOH. Seal cap tightly. Incubate at 40° C. for 1 hour with constant shaking at 250 rpm.
9. Focus organic and aqueous phase by centrifuging for 10 min at 5000 rpm separating the organic phase from the aqueous phase.
10. Withdraw bottom layer (chloroform:MeOH) from the vial with a 10 ml gas tight syringe, avoiding the aqueous layer during the draw. Transfer to a clean flask and dry down.
11. Resolubilize sample from 11 above with appropriate amount of chloroform (0.5 to 0.9 ml). Transesterify using Alltech MethPrep II (Alltech Associates, Inc., Deerfield, Ill. 60015, USA) or sodium methoxide. Alternatively, saponify samples.
12. Silanate samples (optional for glycerol and sterol determination) and inject on to GC with FID detector or Mass Spec detector (Hewlett Packard Model 5970 MSD; Agilent Technologies Palo Alto, Calif. 94303 USA) to quantify or determine the amount or level of sterol related compounds that are found in sample.

Determination of Total (Bound+Unbound) Alpha-Cyclodextrin

13. Centrifuge the isolated aqueous layer from 11 above at 5000×g for 10 min.
14. Filter 1 ml of the centrifuged sample supernatant with 0.45 micrometer nylon filter. Inject on to HPLC molecular sizing column. Quantify total cyclodextrin relative to a response factor developed from a standard curve of pure cyclodextrin.
15. For Pure Fat Samples Only: Weigh remainder of supernatant sample into tared flask. Evaporate moisture to dryness. Record weight of solids. (note: net weight for non-salt containing fat samples will represent free alpha-cyclodextrin)
16. Subtract free alpha-cyclodextrin amounts determined in 8 above from values determined in steps 15 and 16. Value equals total bound alpha-cyclodextrin.

C. Determination of Solid Fat Content of Fats and Oils

Fats containing either alpha-cyclodextrin complexed oil or the same proportion of oil without alpha-cyclodextrin were measured for solid fat content using a Bruker Minispec using the American Oil Chemist's Society (AOCS) Official Method Cd 16b-93 revised 1999, Solid Fat Content (SFC) by Low-Resolution Nuclear Magnetic Resonance—The Direct Method. As can be seen in the table below, fats containing oil complexed with alpha-cyclodextrin have consistently higher solid fat contents.

mixture evenly into the four vessels provided with a Beckman Coulter JS 5.0 swinging bucket rotor (Beckman Coulter, Inc., Fullerton, Calif. 92835). Balance vessels and place in rotor. Centrifuge in a Beckman Coulter J-HC high capacity centrifuge for 15 minutes at 4500 rpm (6,060×g)). Harvest top layer fat (initial moisture ~37%). Repeat until all of the mixture is centrifuged. Dry top layer fat to 5% or less moisture. Drying should be by freeze-drying or spray drying to minimize damage to fat structure (note: drying may not be necessary if top layer fat is to be blended at a low ratio. Blend dried top-layer fat with desired oil mix (e.g. Palm oil, Canola, Oil blend plus emulsifiers, etc.). Blending can be accomplished with a laboratory blender or other medium to high shear mixture. When blending with Palm Oil, warm until oil is clear and flowable. (Heating of oil or oil/emulsifier prior to blending can assist in the more rapid dispersion of the dried top layer.) Fat can be allowed to cool to room temperature to solidify or it can be cooled using a scraped surface heat exchanger to form the solid fat and desired crystal structure.

E. Composition of an Alpha-Cyclodextrin Thickened Fat

The following analysis is of a blend, on a weight basis, of 60% alpha-cyclodextrin complexed HO-Canola top layer fat, 38% palm oil, 2% emulsifier (soybean mono-, di-glycerols; iodine value ~40).

| | |
|---|---|
| Alpha-cyclodextrin | 6% (w/w) |
| Ash | 0% (w/w) |
| Calories (no fiber correction) | 828 calories/100 grams |

| | Solid Fat Content (%) | | | | | | | | | |
|---|---|---|---|---|---|---|---|---|---|---|
| | Fat #1 | | Fat #2 | | Fat #3 | | Fat #4 | | Fat #5 | |
| Temp. (°C) | $A^1$ | $B^2$ | $A^3$ | $B^4$ | $A^5$ | $B^6$ | $A^7$ | $B^8$ | $A^9$ | $B^{10}$ |
| 10.0 | 14.5 | 24.4 | 22.2 | 31.7 | 31.5 | 39.9 | 57.8 | 61.4 | 60.7 | 67.1 |
| 21.1 | 10.1 | 20.1 | 16.1 | 25.3 | 22.6 | 31.2 | 32.6 | 45.7 | 39.8 | 51.2 |
| 26.7 | 7.9 | 18.7 | 12.9 | 22.7 | 17.9 | 27.1 | 21.4 | 35.2 | 27.5 | 41.1 |
| 33.3 | 5.6 | 15.6 | 9.4 | 18.6 | 13.6 | 21.6 | 11.9 | 24.3 | 16.4 | 28.6 |
| 37.8 | 3.9 | 14.0 | 6.8 | 16.2 | 10.4 | 18.2 | 6.8 | 17.7 | 10.1 | 20.4 |

[1] Fat #1 A = 80% high oleic canola oil, 10% palm stearine, 10% mixed soybean mono and diglycerides.
[2] Fat #1 B = 80% alpha-cyclodextrin complexed high oleic canola oil, 10% palm stearine, 10% mixed soybean mono and diglycerides.
[3] Fat #2 A = 70% high oleic canola oil, 20% palm stearine, 10% mixed soybean mono and diglycerides.
[4] Fat #2 B = 70% alpha-cyclodextrin complexed high oleic canola oil, 20% palm stearine, 10% mixed soybean mono and diglycerides.
[5] Fat #3 A = 60% high oleic canola oil, 30% palm stearine, 10% mixed soybean mono and diglycerides.
[6] Fat #3 B = 60% alpha-cyclodextrin complexed high oleic canola oil, 30% palm stearine, 10% mixed soybean mono and diglycerides.
[7] Fat #4 A = 70% palm oil, 20% palm stearine, 10% mixed soybean mono and diglycerides.
[8] Fat #4 B = 70% alpha-cyclodextrin complexed palm Oil, 20% palm stearine, 10% mixed soybean mono and diglycerides.
[9] Fat #5 A = 60% palm oil, 30% palm stearine, 10% mixed soybean mono and 20 diglycerides.
[10] Fat #5 B = 60% alpha-cyclodextrin complexed palm oil, 30% palm stearine, 10% mixed soybean mono and diglycerides D. Preparation of Alpha-Cyclodextrin Thickened Fat Using Centrifugation and Drying.

Ingredients:
30.04 lbs alpha-cyclodextrin
37.55 lbs Oil (Palm or HO Canola)
182.76 lbs Water
(30 gallon mix formula)

Add 182.76 lbs water to mix tank. Start stirrers (e.g. scraped surface and moderate shear mixer). Add 30.04 lbs alpha-cyclodextrin to mixer. Mix for 15 minutes (or until alpha-cyclodextrin is dissolved). Add 37.55 lbs of oil to mixer. Mix for 15 minutes to 1 hour. Distribute 8.8 liters of the -continued

| | |
|---|---|
| Carbohydrates, Total | 11.6% (w/w) |
| Total Fat | 86.8% (w/w) |
| Saturated Fat | 26.2% (w/w) |
| Monounsaturated Fat | 45.4% (w/w) |
| cis-cis Polyunsaturated Fat | 10.8% (w/w) |
| trans Fat | 0.510% (w/w) |
| Moisture by Karl Fischer | 1.59% (w/w) |
| Protein by Kjeldahl (F = 6.25) | 0.00% (w/w) |

F. Alternative Preparation of Alpha-Cyclodextrin Thickened Fat Without Centrifugation or Drying.

Ingredients:
100 kilograms Palm Oil
3 kilograms Water
3 kilograms alpha-cyclodextrin Heat Palm Oil to 50° C. with constant stirring (e.g. lightning mixer at 4.5 or equivalent). Bubble nitrogen gas through oil to reduce susceptibility to oxidation. In a separate vessel, mix water and alpha-cyclodextrin together so that the alpha-cyclodextrin is full hydrated and completely suspended in the water. With a peristaltic pump or similar transfer device slowly add alpha-cyclodextrin water mixture to Palm Oil so that it is added slowly and evenly to completion over a two (2) hour period. Allow Palm Oil, alpha-cyclodextrin, water mixture to continue to stir for at least 1 hour after final addition of alpha-cyclodextrin/water solution. Cool Palm Oil, alpha-cyclodextrin, water mixture on a water/ice bath (4° C.) with constant scraped surface mixing.

G. Roll-In Shortening for Flaked Pastry Products

| Ingredient | Amount (% w/w) |
|---|---|
| Dried alpha-cyclodextrin complexed Palm Oil Top-Layer Fat | 40-70 |
| Palm Stearine | 5-30 |
| Palm Oil | 0-15 |
| Emulsifier (mono-, diglycerides; IV 2 to 50) | 0-20 |

Alternatively,

| Ingredient | Amount (% w/w) |
|---|---|
| Dried alpha-cyclodextrin complexed High Oleic Canola Top-Layer Fat | 40-70 |
| Palm Stearine | 5-30 |
| Palm Oil | 0-15 |
| Emulsifier (mono-, diglycerides; IV 2 to 50) | 0-20 |

In order to form the appropriate crystal structure in the roll-in shortening and the desired melting characteristics, it is necessary to votate the above fat in a scraped surface heat exchanger.

Votation of the fat can be accomplished on a model FT25BBPA-1FC-G Margarine Crystallizer, (Armfield Inc., Jackson, N.J. 08527), consisting of two A-unit scraped surface heat exchanger barrels, one B-unit pinworker barrel, refrigerated brine for heat transfer and a progressive cavity feed pump. Typical votation parameters are listed below.

| Votator Parameter | Low Value | Preferred Value | High Value | Units |
|---|---|---|---|---|
| Feed tank oil temperature (not controlled) | 40 | 82 | 110 | (° C.) |
| | 104 | 180 | 230 | (° F.) |
| Feed pump speed | 10 | 18.2 | 50 | (%) |
| Oil inlet temperature | 30 | 71 | 90 | (° C.) |
| | 86 | 160 | 194 | (° F.) |
| Oil inlet pressure | 1 | 3 | 15 | (bar) |
| Refrigerant inlet temperature (into 2nd stage) | 4 | 26 | 40 | (° C.) |
| | 39.2 | 79 | 104 | (° F.) |

-continued

| Votator Parameter | Low Value | Preferred Value | High Value | Units |
|---|---|---|---|---|
| Refrigerant outlet temperature (out of 1st stage) | 4 | 30 | 45 | (° C.) |
| | 39.2 | 86 | 113 | (° F.) |
| A-units Scraped Surface Heat Exchangers stage agitator speed | 200 | 510 | 800 | (r.p.m.) |
| A-units Scraped Surface Heat Exchangers stage drive current | 1 | 2.75 | 8 | (A) |
| Interim fat temperature (1st-2nd stage) | 15 | 28 | 35 | (° C.) |
| | 59 | 82 | 95 | (° F.) |
| Product temperature | 12 | 28 | 35 | (° C.) |
| | 53.6 | 82 | 95 | (° F.) |
| B-unit Pinworker agitator speed | 40 | 500 | 800 | (r.p.m.) |
| B-unit Pinworker drive current | 0.5 | 2 | 8 | (A) |
| Resting tube outlet fat temperature | 10 | 20 | 30 | (° C.) |
| | 50 | 68 | 86 | (° F.) |

The votated fat should fall within the following specifications:

| Measurement | Low Value | Preferred Value | High Value |
|---|---|---|---|
| SFC at 92 degrees F. | 4% | 12% | 20% |
| SFC at 70 degrees F. | 21% | 34% | 47% |
| SFC at 50 degrees F. | 35% | 48% | 52% |
| AOM Stability (hours) | 40 | 80 | 120 |
| Free Fatty Acids (as Oleic) | 0% | 0.05% | 0.2% |

The votated fat should be tempered for optimal crystal formation. Tempering can be accomplished by resting the fat at 15° C. to 40° C. for one to four days. In an embodiment of the present invention, the fat is rested at about 27° C. for two days.

H. Croissants with Roll-In Shortening

| 24 Croissants | |
|---|---|
| 2 | sticks (0.25 lbs) roll-in shortening |
| 2 | packages active dry yeast |
| ½ | cup warm water (105 to 115 F.) |
| ⅔ | cup luke warm milk (scalded, then cooled) |
| ¼ | cup butter, softened |
| 2 | tablespoons sugar |
| 1½ | teaspoons salt |
| 2 | eggs |
| 4 to 4½ | cups all-purpose flour |
| 1 | egg yolk |
| 1 | tablespoon milk |

Cut each stick shortening crosswise into 3 equal pieces. Place 2 pieces side by side on piece of waxed paper. Cover with second piece of waxed paper. Flatten roll-in shortening into 8-inch square with rolling pin to form a solid sheet. Repeat with remaining pieces of roll-in shortening. Refrigerate squares of roll-in shortening until firm, at least 1½ hours. (Shortening must be very cold to prevent sticking when dough is rolled.) Dissolve yeast in warm water in large bowl. Stir in ⅔ cup milk, ¼ cup butter, the sugar, salt eggs and 2 cups of the flour. Beat until smooth. Stir in enough remaining flour to make dough easy to handle.

Turn dough onto lightly floured surface; knead until smooth and elastic, about 5 minutes. Place in greased bowl; turn greased side up. Cover; let rise in warm place until double, about 1 hour. (Dough is ready if indentation remains when touched.) Punch down dough. Cover; refrigerate 1 hour.

Punch down dough. Roll into rectangle, 25×10 inches, on lightly floured surface. Place 1 square firm shortening on center of dough. Fold dough over butter to make 3 layers. Turn dough one quarter turn; roll out. Repeat twice; placing shortening square on center each time. Work rapidly so shortening does not become soft. Cut dough crosswise into halves; cover and refrigerate 1 hour.

Shape half of the dough at a time (keep other half refrigerated). Roll into rectangle, 12×8 inches. Cut lengthwise into halves; cut each half crosswise into 3 squares. Cut each square diagonally into 2 triangles. Roll up each triangle, beginning at long side. Place rolls with points underneath on ungreased cookie sheet; curve slightly to form crescents. Refrigerate 30 minutes.

Heat oven to 475° F. Beat egg yolk and 1 tablespoon milk slightly; brush croissants with egg yolk mixture. Bake 5 minutes; decrease oven temperature to 4000 F. Bake until croissants are brown and crisp, 8 to 10 minutes.

Croissant recipe adapted from Betty Crocker's International Cookbook. Copyright© 1980 General Mills, Inc. Minneapolis, Minn. Betty Crocker's International Cookbook (1980) ISBN 0-394-50453-4, p. 275.

I. Chip/Flake Shortening Fats

| Ingredient | Amount (% w/w) |
|---|---|
| Dried alpha-cyclodextrin complexed Palm Oil Top-Layer Fat | 40-70 |
| Palm Stearine | 5-30 |
| Emulsifier (mono-, diglycerides; IV 2 to 50) | 0-20 |

Alternatively,

| Ingredient | Amount (% w/w) |
|---|---|
| Dried alpha-cyclodextrin complexed High Oleic Canola Top-Layer Fat | 40-70 |
| Palm Stearine | 5-30 |
| Emulsifier (mono-, diglycerides; IV 2 to 50) | 0-20 |

The above fats should be melted and processed by a chipper/flaker process unit to the following specifications.

| Measurement | Low Value | Preferred Value | High Value |
|---|---|---|---|
| Thickness (inches) | 0.030 | 0.045 | 0.060 |
| SFC at 10 degrees C. | 24% | 60% | 75% |
| SFC at 26.7 degrees C. | 15% | 35% | 50% |
| Hardness (Force in kg) | 4 | 12 | 30 |
| Free Fatty Acids (as Oleic) | 0% | 0.05% | 0.2% |

J. Biscuits Using Chip/Flake Shortening Fat

| 12 biscuits | |
|---|---|
| ⅓ | Chip/Flake Shortening Fat |
| 1¾ | cups all-purpose flour |
| 2½ | teaspoons baking powder |
| ¾ | teaspoon salt |
| ¾ | cup milk |

Heat oven to 450° F. Mix together refrigerated chip/flake shortening fat, flour, baking powder and salt gently. Mix with dough mixer and add just enough milk so dough leaves side of bowl and rounds up into a ball. (Too much milk makes dough sticky, not enough makes biscuit dry.)

Turn dough onto lightly floured surface. Knead lightly 10 times. Roll ½ inch thick. Cut with floured 2-inch biscuit cutter. Place on ungreased cookie sheet about 1 inch apart for crusty sides, touching for soft sides. Bake until golden brown, 10 to 12 minutes. Immediately remove from cookie sheet.

Biscuit recipe adapted from Betty Crocker's Cookbook New and Revised Edition.

Copyright© 1978, 1969 General Mills, Inc. Minneapolis, Minn. Library of Congress Catalog Number: 78-52003; ISBN 0-307-09823-0, p. 194.

K Bar Filling Shortening Fat

| Ingredient | Amount (% w/w) |
|---|---|
| Dried alpha-cyclodextrin complexed Palm Oil Top-Layer Fat | 30-70 |
| Palm Stearine | 5-30 |
| Palm Oil | 0-30 |
| Emulsifier (mono-, diglycerides; IV 2 to 50) | 0-20 |

Alternatively,

| Ingredient | Amount (% w/w) |
|---|---|
| Dried alpha-cyclodextrin complexed High Oleic Canola Top-Layer Fat | 30-70 |
| Palm Stearine | 5-30 |
| Palm Oil | 0-30 |
| Emulsifier (mono-, diglycerides; IV 2 to 50) | 0-20 |

L. Bar Filling Using Alpha-Cyclodextrin Thickened Shortening Fat

The following filling can be used in layered bar fillings for R-T-E cereal bars, granola bars or other variations.

| Ingredient | Usage | Amount to Add (g) |
|---|---|---|
| Sugar (confectionary, powder) | 40.78% | 81.56 |
| Flavor (Vanilla Powder) | 0.32% | 0.64 |
| Salt | 0.25% | 0.50 |
| NFDM (Non-fat dairy milk) | 11.00% | 22.00 |
| Lecithin | 0.15% | 0.30 |
| Bar Filling Shortening Fat | 47.50% | 95.00 |
| Total | 100.00% | 200.00 |

Warm bar filling shortening fat to 35° C. Mix sugar, vanilla powder, salt, and non-fat dairy milk together. Mix lecithin into warmed fat. Slowly add mixture of sugar, vanilla powder, salt and non-fat dairy milk to fat until fully incorporated.

M. Complexation of Palm Oil with Alpha Cyclodexdrin

Sample 1
Palm oil—940 g
AD—27 g
$H_2O$—33 g (a 10% excess of water was used to prevent recrystallization of the AD)
2IV Soy Stearine—20.4 g Palm oil was heated to 80° C. using a jacketed beaker and stirred using a mechanical stirrer. The AD/$H_2O$ was added as a solution in one portion at ca. 80° C. The mixture was stirred while cooling to 50° C. and maintained at 50° C. for 1 hour to ensure complete complexation based on results from the slurry method. The complexation was monitored by SFC and provided similar results to those observed in the pilot plant. After one hour, the mixture was heated to 65° C., transferred to a small pail and allowed to solidify at ambient temperature before refrigerating overnight.

Sample 2
Palm oil—940 g
AD—27 g
$H_2O$—33 g (a 10% excess of water was used to prevent recrystallization of the AD)
21V Soy Stearine—20.4 g Palm oil was heated to 80° C. using a jacketed beaker and stirred using a mechanical stirrer. The AD/$H_2O$ was added as a solution in one portion at ca. 80° C. The mixture was stirred while cooling to 65° C. and maintained at 65° C. for 15 minutes. 2% 2IV soy stearine was added. The mixture was stirred an additional ten minutes at 65° C., transferred to a small pail and allowed to solidify at ambient temperature before refrigerating overnight.

Sample 3
Palm oil—940 g
AD—27 g
$H_2O$—33 g (a 10% excess of water was used to prevent recrystallization of the AD)
2IV Soy Stearine—20.4 g Palm oil was heated to 50° C. using a jacketed beaker and stirred using a mechanical stirrer. The AD/$H_2O$ was added as a solution in one portion at ca. 80° C. The mixture was stirred at 50° C. for 1 hour. The complexation was monitored by SFC as before. After one hour, the mixture was heated to 65° C. and 2% 2IV soy stearine was added. The mixture was stirred an additional ten minutes at 65° C., transferred to a small pail and allowed to solidify at ambient temperature before refrigerating overnight.

Sample 4—High Shear Mixture
Palm oil—940 g
AD—27 g
$H_2O$—33 g (a 10% excess of water was used to prevent recrystallization of the AD)
2IV Soy Stearine—20.4 g Palm oil was heated to 50° C. using a jacketed beaker and stirred using the high shear immersion mixer. The AD/$H_2O$ was added as a solution in one portion at ca. 80° C. The mixture was stirred at 50° C. for 25 minutes and the mixture observed by microscopy. After 25 minutes, the mixture was heated to 65° C. and 2% 2IV soy stearine was added. The mixture was stirred an additional ten minutes at 65° C., transferred to a small pail and allowed to solidify at ambient temperature before refrigerating overnight.

Observations

Samples 1 and 3 behaved similarly, while Sample 2 separated, however, SFC and TA data for all three fats were very similar and comparable to convectional fat useful for popcorn.

|  | SFC | TA (F and F/T) | |
| --- | --- | --- | --- |
| Sample 1 | 10-54.242 | 4.420 | 5.841 |
|  | 21.1-29.903 |  |  |
|  | 26.7-19.022 |  |  |
|  | 33.3-12.144 |  |  |
|  | 37.8-7.956 |  |  |
| Sample 2 | 10-53.746 | 5.573 | 8.956 |
|  | 21.1-28.322 |  |  |
|  | 26.7-17.850 |  |  |
|  | 33.3-11.218 |  |  |
|  | 37.8-7.507 |  |  |
| Sample 3 | 10-54.354 | 3.369 | 5.152 |
|  | 21.1-28.338 |  |  |
|  | 26.7-17.758 |  |  |
|  | 33.3-10.793 |  |  |
|  | 37.8-7.613 |  |  |
| Sample 4 | 10-54.288 | 3.776 | 4.600 |
|  | 21.1-27.797 |  |  |
|  | 26.7-16.920 |  |  |
|  | 33.3-10.185 |  |  |
|  | 37.8-6.456 |  |  |
| Benchmark Popcorn Fat | 10-55.552 | 4.291 | 6.028 |
|  | 21.1-25.873 |  |  |
|  | 26.7-16.851 |  |  |
|  | 33.3-9.735 |  |  |
|  | 37.8-6.823 |  |  |

N. Complexation of Canola Oil with Alpha Cyclodextrin

Method 1

High oleic canola oil—750 g
10% AD/$H_2O$—150 g (1:1::AD;water)
2IV Soy Stearine—238 g
AMGS—119 g High oleic canola was heated to 70° C. using a jacketed beaker and mechanical stirring. 150 g of AD/$H_2O$ as a 1:1 mixture was heated to 80° C. at which time it became a solution. The solution was then added hot in one portion to the hot oil and the oil was allowed to cool to 15° C. When the mixture cooled to 65° C., a 70 g aliquot was taken from the beaker and a sample of 70:20:10 was prepared. The mixture was stirred at 15° C. for 1 hour and then heated to 65° C. before adding the 2IV and AMGS. The mixture was stirred for ten minutes after adding the saturates and then poured off and hand votated before storing in the refrigerator overnight.

Method 2

High oleic canola oil—500 g
10% AD/$H_2O$—43.5 g (1:1::AD;water)
2IV Soy Stearine—155.3 g
AMGS—77.6 g High oleic canola was cooled to 15° C. using a jacketed beaker and mechanical stirring. 43.5 g of AD/$H_2O$ as a 1:1 mixture added slowly dropwise (0.45 g/min.) using a pump while the mixture stirred at 15° C. When the addition was complete, the mixture was stirred at 15° C. for 1 hour and then heated to 65° C. before adding the 2IV and AMGS. The mixture was stirred for ten minutes after adding the saturates and then poured off and hand votated before storing in the refrigerator overnight.

Method 3

High oleic canola oil—500 g

10% AD/H$_2$O—43.5 g (1:1::AD;water)

2IV Soy Stearine—155.3 g

AMGS—77.6 g

High oleic canola was cooled to 70° C. using a jacketed beaker and mechanical stirring. 43.5 of AD/H$_2$O as a 1:1 mixture was heated to 80° C. at which time it became a solution. The solution was then added hot in one portion to the hot oil and the oil was allowed to cool to 15° C. The mixture was stirred at 15° C. for 1 hour and then heated to 65° C. before adding the 2IV and AMGS. The mixture was stirred for ten minutes after adding the saturates and then poured off and hand votated before storing in the refrigerator overnight.

Method 4

High oleic canola oil—750 g

10% AD/H$_2$O—68.3 g (1:2::AD:water)

2IV Soy Stearine—238 g

AMGS—119 g

High oleic canola was heated to 70° C. using a jacketed beaker and stirring. 68.3 of AD/H$_2$O as a 1:2 mixture was heated to 80° C. at which time it became a solution. The solution was then added hot in one portion to the hot oil and the oil was allowed to cool to 15° C. The mixture was stirred at 15° C. for 1 hour and then heated to 65° C. before adding the 2IV and AMGS. The mixture was stirred for ten minutes after adding the saturates and then poured off and hand votated before storing in the refrigerator overnight.

Observations

Texture Analysis:

| Sample Number | F | F/T |
| --- | --- | --- |
| N-1 | 24.174 | 35.631 |
| N-2 | 20.731 | 29.470 |
| N-3 | 19.148 | 30.128 |
| N-4 | 20.9011 | 41.960 |
| N-5 | 12.9824 | 24.132 |

SFC:

| Sample # | 10° C. | 21.1° C. | 26.7° C. | 33.3° C. | 37.8° C. |
| --- | --- | --- | --- | --- | --- |
| N-1 | 36.4 | 35.3 | 34.6 | 33.4 | 32.3 |
| N-2 | 35.7 | 34.4 | 33.8 | 32.4 | 31.4 |
| N-3 | 35.8 | 34.2 | 33.5 | 32.2 | 31.0 |
| N-4 | 35.9 | 33.7 | 32.5 | 30.9 | 29.3 |
| N-5 | 36.0 | 34.1 | 32.9 | 30.9 | 29.3 |

All patents, patent documents, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of preparing a thickened fat composition comprising a fat component having about 40% or less by weight of trans fat, and a cyclodextrin, wherein at least about 25% of the cyclodextrin in the composition is bound to the fat; the method comprising the steps of:
   a) solubilizing a cyclodextrin in water;
   b) mixing fat and the solvent solubilized cyclodextrin to form a fat/cyclodextrin/solvent mixture;
   c) separating the fat/cyclodextrin/solvent mixture into separate portions, wherein at least one portion is a thickened fat/cyclodextrin composition comprising fat that has been complexed with cyclodextrin, wherein at least about 25% of the cyclodextrin in the thickened fat/cyclodextrin composition is bound to the fat, and wherein the thickened fat/cyclodextrin composition exhibits a viscosity that is greater than 2 times the viscosity of the fat without the cyclodextrin; and
   d) segregating the thickened fat/cyclodextrin composition from the remaining portions of the fat/cyclodextrin/solvent mixture.

2. The method of claim 1, wherein at least about 50% of the cyclodextrin in the thickened fat/cyclodextrin composition is bound to the fat.

3. The method of claim 1, wherein the fat/cyclodextrin/solvent mixture is separated by centrifuging the composition for a time and at a speed sufficient to separate the portions into segregatable layers.

4. The method of claim 1, wherein the fat/cyclodextrin/solvent mixture is separated into at least first, second and third portions, wherein
   the first portion is a thickened fat/cyclodextrin composition comprising fat that has been complexed with cyclodextrin, wherein at least about 25% of the cyclodextrin in the thickened fat/cyclodextrin composition is bound to the fat, the first portion having a density less than 1 g/ml;
   the second portion is an aqueous phase containing solubilized cyclodextrin; and
   the third portion is a thickened fat/cyclodextrin composition comprising fat that has been complexed with cyclodextrin, the third portion having a density greater than 1 g/ml.

5. The method of claim 4, wherein the first portion is removed from the fat/cyclodextrin/solvent mixture.

6. The method of claim 1, wherein the solvent comprises water.

7. The method of claim 1, wherein the thickened fat/cyclodextrin composition exhibits a viscosity that is greater than 10 times the viscosity of the fat without the cyclodextrin.

8. The method of claim 1, wherein the thickened fat/cyclodextrin composition exhibits a viscosity that is greater than 20 times the viscosity of the fat without the cyclodextrin.

9. The method of claim 1, wherein the thickened fat/cyclodextrin composition exhibits a viscosity that is greater than 30 times the viscosity of the fat without the cyclodextrin.

10. A method of preparing a thickened fat composition comprising a fat component having about 40% or less by weight of trans fat, and a cyclodextrin, wherein at least about 25% of the cyclodextrin in the composition is bound to the fat, the method comprising the steps of:
    a) solubilizing a cyclodextrin in a solvent;
    b) mixing fat and the solubilized cyclodextrin to form a fat/cyclodextrin/solvent mixture;
    c) separating the fat/cyclodextrin/solvent mixture into separate portions, wherein at least one portion is a thickened fat/cyclodextrin composition comprising fat that has been complexed with cyclodextrin, wherein at least about 25% of the cyclodextrin in the thickened fat/cyclodextrin composition is bound to the fat, and wherein the thickened fat/cyclodextrin composition exhibits a viscosity that is greater than 2 times the viscosity of the fat without the cyclodextrin; and d) segregating the thickened fat/cyclodextrin composition from the remaining portions of the fat/cyclodextrin/solvent mixture.

11. The method of claim 10, wherein the thickened fat/cyclodextrin composition exhibits a viscosity that is greater than 10 times the viscosity of the fat without the cyclodextrin.

12. The method of claim 10, wherein the thickened fat/cyclodextrin composition exhibits a viscosity that is greater than 20 times the viscosity of the fat without the cyclodextrin.

13. The method of claim 10, wherein the thickened fat/cyclodextrin composition exhibits a viscosity that is greater than 30 times the viscosity of the fat without the cyclodextrin.

14. A method of preparing a thickened fat composition comprising a fat component having about 40% or less by weight of trans fat, and a cyclodextrin, wherein at least about 25% of the cyclodextrin in the composition is bound to the fat, the method comprising the steps of:

a) solubilizing a cyclodextrin in a solvent;

b) adding the solubilized cyclodextrin to a fat at an addition rate that is sufficiently slow and with sufficient agitation to provide a thickened fat/cyclodextrin composition comprising fat that has been complexed with cyclodextrin, wherein at least about 25% of the cyclodextrin in the thickened fat/cyclodextrin composition is bound to the fat and wherein the thickened fat/cyclodextrine composition exhibits a viscosity that is greater than 2 times the viscosity of the fat without the cyclodextrin.

15. The method of claim 14, wherein the addition of the solubilized cyclodextrin to the fat is carried out at a temperature of from about 4° C. to about 95° C.

16. The method of claim 14, wherein the thickened fat/cyclodextrin composition exhibits a viscosity that is greater than 10 times the viscosity of the fat without the cyclodextrin.

17. The method of claim 14, wherein the thickened fat/cyclodextrin composition exhibits a viscosity that is greater than 20 times the viscosity of the fat without the cyclodextrin.

18. The method of claim 14, wherein the thickened fat/cyclodextrin composition exhibits a viscosity that is greater than 30 times the viscosity of the fat without the cyclodextrin.

19. A method of preparing a thickened fat composition, comprising a) solubilizing a cyclodextrin in a solvent;

b) providing a first fat composition;

e) mixing the first fat composition with the solubilized cyclodextrin to form a first fat/cyclodextrin/solvent mixture comprising a first fat/cyclodextrin complex; wherein the temperature difference between the first fat composition and the solubilized cyclodextrin at the time of mixing is less than or equal to about 15° C. and wherein the thickened fat/cyclodextrin/solvent mixture exhibits a viscosity that is greater than 2 times the viscosity of the fat without the cyclodextrin.

20. The method of claim 19, wherein the temperature of the first fat composition is greater than or equal to the temperature of the solubilized cyclodextrin at the time of mixing.

21. The method of claim 19, wherein the first fat composition is a mixture of fats.

22. The method of claim 19, further comprising mixing a second fat composition with the first fat/cyclodextrin/solvent mixture after formation of the first fat/cyclodextrin complex.

23. The method of claim 19, further comprising d) providing a second fat composition;

e) mixing the second fat composition with the solubilized cyclodextrin to form a second fat/cyclodextrin/solvent mixture comprising a second fat/cyclodextrin complex; wherein the temperature difference between the second fat composition and the solubilized cyclodextrin at the time of mixing is less than or equal to about 15° C.; and f) mixing the first fat/cyclodextrin complex with the second fat/cyclodextrin complex.

24. The method of claim 19, wherein the first fat composition comprises palm oil, and the temperature of each of the first fat composition and the solubilized cyclodextrin at the time of mixing is from about 50° C. to about 90° C., and after mixing, the at/cyclodextrin/solvent mixture is held at a temperature of from about 35° C. to about 65° C. for a period of at least about 30 minutes.

25. The method of claim 19, wherein the first fat composition comprises palm oil, and the temperature of each of the first fat composition and the solubilized cyclodextrin at the time of mixing is from about 35° C. to about 65° C.

26. The method of claim 19, wherein the first fat composition comprises canola oil, and the temperature of each of the first fat composition and the solubilized cyclodextrin at the time of mixing is from about 60° C. to about 30° C., and after mixing, the at/cyclodextrin/solvent mixture is held at a temperature of from about 0° C. to about 30° C. for a period of at least about 30 minutes.

27. The method of claim 19, wherein the first fat composition comprises canola oil, and the temperature of each of the first fat composition and the solubilized cyclodextrin at the time of mixing is from about 0° C. to about 30° C.

28. The method of claim 19, wherein the ratio of cyclodextrin to first fat composition is about 1-5% by weight.

29. The method of claim 19, wherein the solubilized cyclodextrin is added to the first fat composition in sequential additions.

30. The method of claim 29, wherein the amount of the solubilized cyclodextrin to be added to the first fat composition is determined by in-process measurement of viscosity of the first fat/cyclodextrin/solvent mixture until a predetermined target viscosity is reached.

31. The method of claim 19, wherein the solubilized cyclodextrin is added to the first fat composition under shear mixing conditions.

32. The method of claim 29, wherein the solubilized cyclodextrin is added to the first fat composition under shear mixing conditions.

33. The method of claim 19, wherein the solvent is water.

34. The method of claim 19, wherein the cyclodextrin is solubilized in solvent at a cyctodextrin:solvent mix ratio of from about 0.01:1 to about 5:1 by weight.

35. The method of claim 19, wherein the cyclodextrin is alpha cyclodextrin.

36. The method of claim 19, comprising the steps of a) determining the temperature at which optimal complexation takes place of a given fat composition with cyclodextrin in accordance with the present method, and b) carrying out the complexation method of claim 1 within about 15° C. of the determined optimal complexation temperature.

37. The method of claim 19, comprising the steps of a) determining the temperature at which optimal complexation takes place of a given fat composition with cyclodextrin in accordance with the present method, b) mixing the fat composition and the solubilized cyclodextrin at an initial mixing temperature that is at least about 15° C. higher than the determined optimal complexation temperature, and
c) allowing the mixed fat composition and the solubilized cyclodextrin composition to cool and be held within about 15° C. of the optimal complexation temperature of the fat composition for a period of at least about 30 minutes.

38. The method of claim 19, wherein the thickened fat/cyclodextrin/solvent mixture exhibits a viscosity that is greater than 10 times the viscosity of the fat without the cyclodextrin.

39. The method of claim 19, wherein the thickened fat/cyclodextrin/solvent mixture exhibits a viscosity that is greater than 20 times the viscosity of the fat without the cyclodextrin.

40. The method of claim 19, wherein the thickened fat/cyclodextrin/solvent mixture exhibits a viscosity that is greater than 30 times the viscosity of the fat without the cyclodextrin.

* * * * *